United States Patent
Hsu et al.

(10) Patent No.: US 10,879,715 B2
(45) Date of Patent: Dec. 29, 2020

(54) METHOD FOR IMPROVING TEMPERATURE MANAGEMENT OF BATTERY PACK

(71) Applicant: MEDIATEK INC., Hsin-Chu (TW)

(72) Inventors: Chih-Yuan Hsu, Hsinchu (TW); Chi-Ming Lee, Hsinchu (TW); Shih-Ming Chen, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 398 days.

(21) Appl. No.: 15/852,026

(22) Filed: Dec. 22, 2017

(65) Prior Publication Data

US 2018/0262017 A1  Sep. 13, 2018

Related U.S. Application Data

(60) Provisional application No. 62/468,423, filed on Mar. 8, 2017.

(51) Int. Cl.
*H02J 7/00* (2006.01)
*G01K 13/00* (2006.01)
(Continued)

(52) U.S. Cl.
CPC .............. *H02J 7/007* (2013.01); *G01K 13/00* (2013.01); *H01M 10/425* (2013.01);
(Continued)

(58) Field of Classification Search
USPC ................................................ 320/150–154
See application file for complete search history.

(56) References Cited

U.S. PATENT DOCUMENTS

7,615,968 B2  11/2009  Villefrance et al.
7,862,919 B2   1/2011  Kim et al.
(Continued)

FOREIGN PATENT DOCUMENTS

CN  101118979 A  2/2008
CN  101394103 A  3/2009
(Continued)

OTHER PUBLICATIONS

Machine Translation of KR100790480 (Year: 2008).*
(Continued)

*Primary Examiner* — Samuel Berhanu
(74) *Attorney, Agent, or Firm* — McClure, Qualey & Rodack, LLP

(57) ABSTRACT

The invention provides a method for improving temperature management of a battery pack. The battery pack may comprise a battery cell charged via at least one supply trace of a PCB (printed circuit board), a protection circuit module mounted on the PCB and coupled to the at least one supply trace, and a plurality of temperature sensors respectively reflecting a temperature of the battery cell and a temperature of the PCB. The method may comprise: measuring a cell temperature and a PCB temperature by the temperature sensors; when charging the battery cell by a charging current and a charging voltage, controlling the charging voltage and the charging current according to the cell temperature, and adjusting the charging current further according to the PCB temperature, so as to constrain the temperature of the PCB.

20 Claims, 8 Drawing Sheets

(51) Int. Cl.
  *H01M 10/48* (2006.01)
  *H01M 10/44* (2006.01)
  *H01M 10/42* (2006.01)

(52) U.S. Cl.
  CPC ....... *H01M 10/443* (2013.01); *H01M 10/486* (2013.01); *H02J 7/0029* (2013.01); *H02J 7/00041* (2020.01); *H02J 7/0047* (2013.01); *H02J 7/0063* (2013.01); *H01M 2200/00* (2013.01)

(56) References Cited

U.S. PATENT DOCUMENTS

| | | | | |
|---|---|---|---|---|
| 8,120,328 | B2 * | 2/2012 | Eto | H02J 7/0029 320/150 |
| 8,203,314 | B2 | 6/2012 | Odaohhara | |
| 9,285,278 | B2 | 3/2016 | Heresztyn et al. | |
| 2004/0135553 | A1 * | 7/2004 | Sakakibara | H01M 10/46 320/150 |
| 2008/0284379 | A1 * | 11/2008 | Hirano | H01M 10/443 320/150 |
| 2009/0121685 | A1 * | 5/2009 | Eto | H01M 10/443 320/152 |
| 2009/0123829 | A1 | 5/2009 | Kim et al. | |
| 2010/0079112 | A1 * | 4/2010 | Nagashima | H02J 7/0031 320/134 |
| 2010/0176768 | A1 * | 7/2010 | Kimura | H01M 10/443 320/152 |
| 2011/0050175 | A1 | 3/2011 | Odaohhara et al. | |
| 2012/0021255 | A1 | 1/2012 | Kim | |
| 2016/0126758 | A1 | 5/2016 | Wu et al. | |

FOREIGN PATENT DOCUMENTS

| | | |
|---|---|---|
| CN | 101411035 A | 4/2009 |
| CN | 101431168 A | 5/2009 |
| CN | 104536483 A | 4/2015 |
| CN | 205883705 U | 1/2017 |
| EP | 3154120 A1 | 10/2015 |
| KR | 100790480 B1 | 1/2008 |
| TW | I423500 | 4/2012 |
| TW | 201502736 | 1/2015 |
| WO | 2015147527 A1 | 10/2015 |

OTHER PUBLICATIONS

EP Search Report dated Jul. 12, 2018 in EP application (No. 18150778.1-1103).
Office Action issued in corresponding Taiwan Patent Application No. 107106987 dated Sep. 20, 2018.
CN Office Action dated Jan. 20, 2020, in Chinese application (No. 201810181685.2).

\* cited by examiner

METHOD FOR IMPROVING TEMPERATURE MANAGEMENT OF BATTERY PACK

This application claims the benefit of U.S. provisional application Ser. No. 62/468,423, filed Mar. 8, 2017, the disclosure of which is incorporated by reference herein in its entirety.

FIELD OF THE INVENTION

The present invention relates to method for improving temperature management of battery pack, and more particularly, to method which may be applied to a battery pack equipped with different temperature sensors respectively for reflecting a temperature of a battery cell and a temperature of a PCB (printed circuit board) of the battery pack, and may therefore improve temperature management of battery pack by adjusting a charging current according to the PCB temperature when charging the battery cell, so as to constrain the temperature of the PCB.

BACKGROUND OF THE INVENTION

Mobile devices, such as notebook computers, tablet computers, mobile phones, digital cameras, camcorders, navigators, portable game consoles, wearable gadgets, etc., have been broadly utilized in modern daily life. In a mobile device, battery pack for storing and supplying power is an essential component.

Please refer to FIG. 1 illustrating a prior art battery pack 100 for a mobile device (not shown). The battery pack 100 includes a battery cell B0, a protection circuit module (PCM) 120 mounted on a PCB 110, and a temperature sensor S0. The PCB 110 has two supply pins B+ and B−, the pin B+ is coupled to an anode of the battery cell B0 at a node n11 via a supply trace P+ of the PCB 110, and the pin B− is coupled to a cathode of the battery cell B0 at a node n12 via another supply trace P− of the PCB 110. The battery cell B0 can be charged (recharged) by charging current supplied to the pin B+ and charging voltage applied between the pins B+ and B−, so as to store electrical power. On the other hand, the battery cell B0 can supply stored power to the mobile device by delivering discharging current via the pin B+.

The PCM 120 includes a protection circuit 122 and two transistors Ma0 and Mb0. A drain terminal and a source terminal of the transistor Ma0 and a drain terminal and a source terminal of the transistor Mb0 are serially coupled between the pin B− and the node n12. Gate terminals of the transistors Ma0 and Mb0 are coupled to the protection circuit 122. By the transistors Ma0 and Mb0, the protection circuit 122 detects and mitigates over-voltage and over-current occurred at the pins B+ and B−.

The temperature sensor S0 is coupled between the node n12 and a pin iT11 of the PCB 110. The temperature sensor S0 is designed to sense a temperature of the battery cell B0, and reflects the sensed cell temperature via the pin iT11. Japan Electronics and Information Technology Industries Association (JEITA) provides guidelines for battery charging safety. When charging the battery cell B0, the JEITA guidelines suggest to adopt cell temperature-dependent upper bounds for the charging current and the charging voltage.

Aforementioned prior art fails to consider temperature of the PCB 110. The PCM 120 operates (performs over-voltage and over-current protection) without referring to any temperature measurement. The JEITA guidelines only consider temperature of battery cell. However, when large amount of charging current flows at the traces P+ and P−, finite parasite impedance of the traces P+, P− and the transistors Ma0, Mb0 will dissipate considerable power to raise temperature of the PCB 110, so the PCB 110 will become another heat source in addition to the charging battery cell B0. As a heat source, the PCB 110 will heat the entire mobile device to make user feel uncomfortable, event get burned. Furthermore, the PCB 100 will heat the battery cell B0 to jeopardize safety of the battery cell B0 and the battery pack 100, event to cause permanent damage or explosion of the battery cell B0.

SUMMARY OF THE INVENTION

To address aforementioned issues of prior art, an objective of the invention is providing a method for improving temperature management of a battery pack (e.g., 200, 600, 700 or 800 in FIG. 2, 6, 7 or 8), wherein the battery pack may comprise a battery cell (e.g., B1 in FIG. 2, 6, 7 or 8) charged via at least one supply trace (e.g., P+ or P− in FIG. 2, 6, 7 or 8) of a PCB (210, 610, 710 or 810 in FIG. 2, 6, 7 or 8), a protection circuit module (e.g., 220 in FIG. 2, 6, 7 or 8) mounted on the PCB and coupled to the at least one supply trace, and a plurality of temperature sensors, including at least one cell temperature sensor (e.g., S1 in FIG. 2, 6, 7 or 8) and at least one PCB temperature sensor (e.g., S2 in FIG. 2, 6, 7 or 8). Each said cell temperature sensor may reflect a temperature of the battery cell, and each said PCB temperature sensor may reflect a temperature of the PCB. The method may comprise: measuring a cell temperature by the at least one cell temperature sensor (e.g., step 304 in FIG. 3a), and measuring a PCB temperature (e.g., step 404 or 504 in FIG. 4a or 5a) by the at least one PCB temperature sensor; when charging the battery cell by a charging current (e.g., Ic in FIG. 2, 6, 7 or 8) and a charging voltage (e.g., Vc in FIG. 2, 6, 7 or 8), controlling the charging voltage and the charging current according to the cell temperature (e.g., FIG. 2, 6, 7, 8 or step 306 in FIG. 3a); and, adjusting the charging current (e.g., FIG. 2, 6, 7, 8 or step(s) 410, 414 and/or 416 in FIG. 4a) further according to the PCB temperature, so as to constrain the temperature of the PCB.

In an embodiment (e.g., FIG. 6), the battery pack (e.g., 600) may further comprise a temperature sensor interface (e.g., TIF6) of a single temperature interface pin (e.g., iT61), and a monitoring circuit (e.g., 640) coupled between the single temperature interface pin and the plurality of temperature sensors, for enabling temperature measuring by each of the plurality of temperature sensors.

In an embodiment (e.g., FIG. 2 or 7), the battery pack (e.g., 200 or 700 in FIG. 2 or 7) may further comprise a temperature sensor interface (e.g., TIF2 or TIF7) which may include a first temperature interface pin (e.g., iT21 or iT71) and a second temperature interface pin (e.g., iT22 or iT72). Wherein one (e.g., S1) of the at least one cell temperature sensor may be coupled to the first temperature interface pin, and one (e.g., S2) of the at least one PCB temperature sensor may be coupled to the second temperature interface pin. In an embodiment (e.g., FIG. 2), the battery pack (e.g., 200 in FIG. 2) may further comprise a monitoring circuit (e.g., 240) coupled to the second temperature interface pin, for enabling temperature measuring by rest (e.g., S2, S3 and/or S4) of the plurality of temperature sensors other than said one of the at least one cell temperature sensor.

In an embodiment (e.g., FIG. 8), the battery pack (e.g., 800 in FIG. 8) may further comprise: a temperature sensor interface (e.g., TIF8) and a monitoring circuit (e.g., 840). The temperature sensor interface may include a first temperature interface pin (e.g., iT81) and a second temperature interface pin (e.g., iT82), with one (e.g., S1) of the at least one cell temperature sensor being coupled to the first temperature interface pin. The monitoring circuit may be coupled between the second temperature interface pin and rest (e.g., S2 to S4) of the plurality of temperature sensors other than said one of the at least one cell temperature sensor, for enabling temperature measuring by said rest of the plurality of temperature sensors.

In an embodiment (e.g., FIG. 4a), adjusting the charging current further according to the PCB temperature may comprise: decreasing the charging current (e.g., step 410) if the PCB temperature is higher than a first temperature threshold (e.g., T_1), and increasing the charging current (e.g., step 414) if the PCB temperature is lower than a second temperature threshold (e.g., T_1H); wherein the first temperature threshold is not lower than the second temperature threshold. In an embodiment (e.g., FIG. 4a), adjusting the charging current further according to the PCB temperature may further comprise: turning off charging (e.g., step 416) if the PCB temperature is higher than a maximum temperature threshold (e.g., T_max); wherein the maximum temperature threshold is not lower than the first temperature threshold. In an embodiment (e.g., FIG. 4a), the method may further comprise: issuing a warning message (e.g., step 418) if the PCB temperature is higher than the maximum temperature threshold.

In an embodiment (e.g., FIGS. 3a and 3b), controlling the charging voltage and the charging current according to the cell temperature (e.g., step 306) may comprise: keeping the charging voltage (e.g., Vc) below a first voltage threshold (e.g., V_FLOAT1) if the cell temperature is in a middle temperature range (e.g., T_LSOFT to T_HSOFT), keeping the charging voltage below a second voltage threshold (e.g., V_FLOAT2) if the cell temperature is in a high temperature range (e.g., T_HSOFT to T_HHARD), and keeping the charging voltage below the second voltage threshold if the cell temperature is in a low temperature range (e.g., T_LHARD to T_LSOFT). The high temperature range may be higher than the middle temperature range, the low temperature range may be lower than the middle temperature range, and the second voltage threshold may be lower than the first voltage threshold.

In an embodiment (e.g., FIGS. 3a and 3b), controlling the charging voltage and the charging current according to the cell temperature (e.g., step 306) may comprise: keeping the charging current (e.g., Ic) below a first current threshold (e.g., ICHG) if the cell temperature is in a middle temperature range (e.g., T_LSOFT to T_HSOFT), keeping the charging current below a second current threshold (e.g., ICHG_SOFT) if the cell temperature is in a high temperature range (e.g., T_HSOFT to T_HHARD), and keeping the charging current below the second current threshold if the cell temperature is in a low temperature range (e.g., T_LHARD to T_LSOFT). The high temperature range may be higher than the middle temperature range, the low temperature range may be lower than the middle temperature range, and the second current threshold may be lower than the first current threshold.

In an embodiment (e.g., FIG. 2, 6, 7 or 8), the method may further comprise: when the battery cell discharges to a system load (e.g., L_sys), adjusting the system load according to the PCB temperature. In an embodiment (e.g., FIG. 5a), adjusting the system load according to the PCB temperature may comprise: lowering the system load (e.g., step 508 in FIG. 5a) if the PCB temperature is higher than a discharging temperature threshold (e.g., T_Mdis). In an embodiment (e.g., FIG. 5a), adjusting the system load according to the PCB temperature may comprise: disabling the system load (e.g., step 508) if the PCB temperature is higher than a discharging temperature threshold. In an embodiment (e.g., FIG. 5a), the method may further comprise: when the battery cell discharges to a system load, issuing a warning message (e.g., step 508) if the PCB temperature is higher than a discharging temperature threshold.

An objective of the invention is providing a method for improving temperature management of a battery pack (e.g., 200, 600, 700 or 800 in FIG. 2, 6, 7 or 8). The battery pack may comprise: a battery cell (e.g., B1) discharging via at least one supply trace (e.g., P+ and/or P−) of a PCB (e.g., 210, 610, 710 or 810), a protection circuit module (e.g., 220) mounted on the PCB and coupled to the at least one supply trace, and a plurality of temperature sensors which may include at least one cell temperature sensor (e.g., S1) and at least one PCB temperature sensor (e.g., S2); each said cell temperature sensor reflecting a temperature of the battery cell, and each said PCB temperature sensor reflecting a temperature of the PCB. The method may comprise: measuring a PCB temperature (e.g., step 504 in FIG. 5a) by the at least one PCB temperature sensor, and, when the battery cell discharges to a system load, adjusting the system load (e.g., step 508 in FIG. 5a) according to the PCB temperature.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
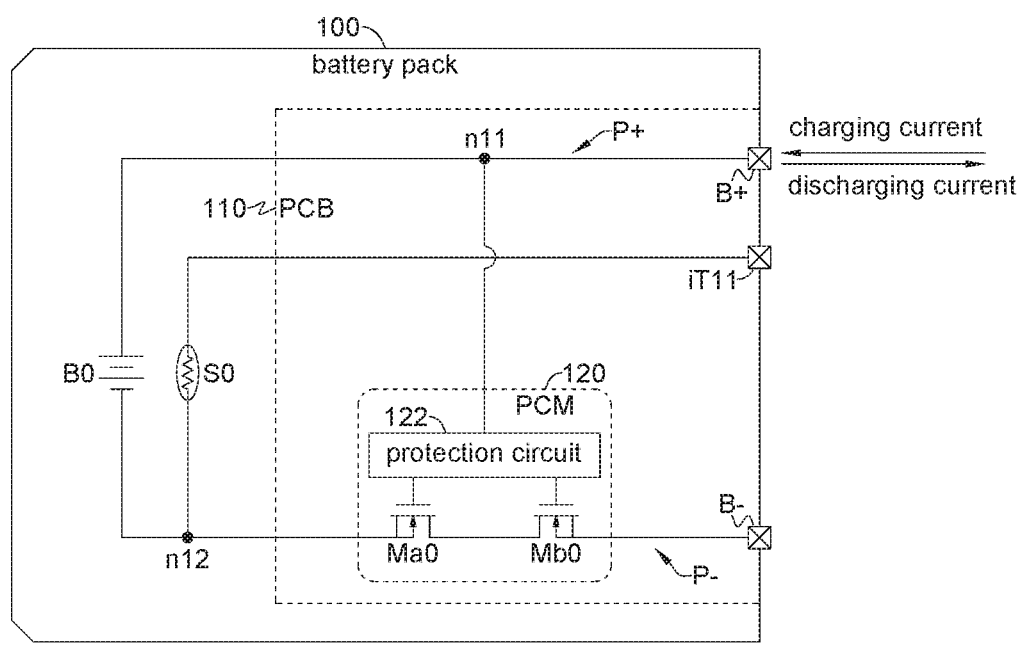
FIG. 1 (prior art) illustrates a conventional battery pack.
Figure 2:
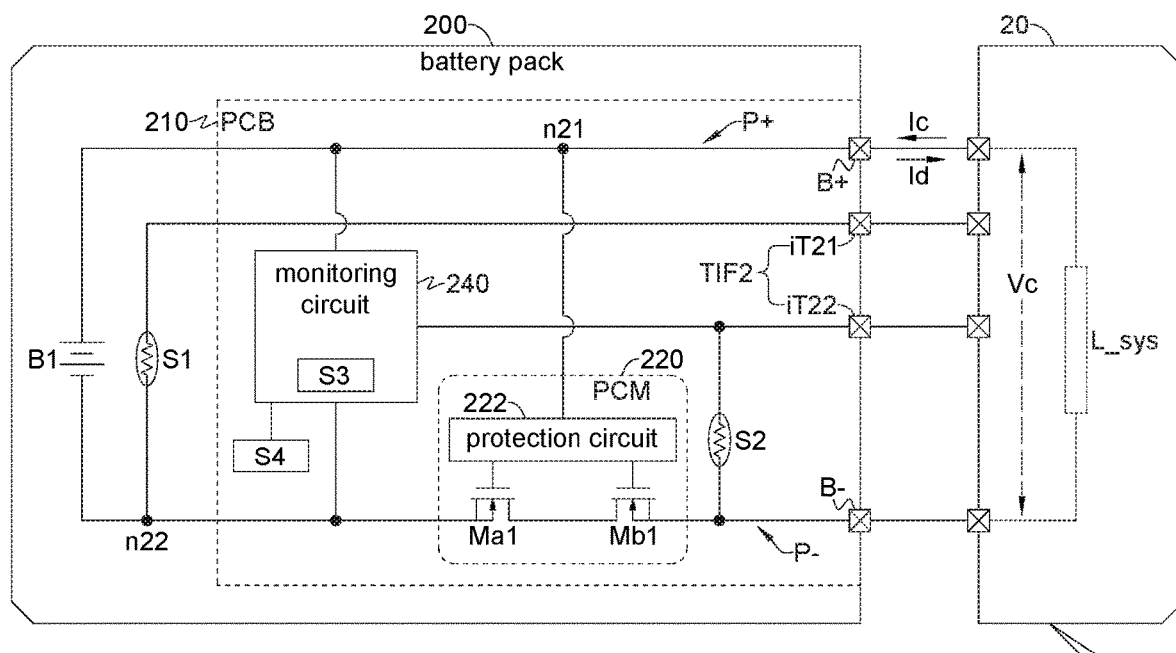
FIG. 2 illustrates a battery pack according to an embodiment of the invention.

Please refer to FIG. 2 illustrates a battery pack 200 for a device 20 according to an embodiment of the invention. The device 20 may be a mobile device, such as a notebook computer, a tablet computer, a mobile phone, a digital cameras, a camcorder, a navigator, a portable game console or a wearable gadget, etc. The device 20 may include (not shown) an application processor, a monitor, and a user interface, etc. The battery pack 200 may include a battery cell B1, a PCM 220 mounted on a PCB 210, a monitoring circuit 240 and a plurality of temperature sensors, such as S1 to S4 in the example of FIG. 2. The PCB 110 may include two supply pins B+ and B−, along with a temperature sensor interface TIF2 which may include two temperature interface pins iT21 and iT22.

The pin B+ may be coupled to an end (e.g., anode) of the battery cell B1 at a node n21 via a supply trace P+ of the PCB 210, and the pin B− may be coupled to another end (e.g., cathode) of the battery cell B1 at a node n22 via another supply trace P− of the PCB 210. The battery cell B1 may be charged (recharged) by a charging current Ic supplied from the device 20 to the pin B+, and by a charging voltage Vc applied between the pins B+ and B−, so as to store power. On the other hand, the battery cell B1 may discharge stored power to supply the device 20 by delivering discharging current Id via the pin B+.

The PCM 220 may be coupled to the node n21, and may include a protection circuit 222 and two transistors Ma1 and Mb1. A drain terminal and a source terminal of the transistor Ma1 and a drain terminal and a source terminal of the transistor Mb1 may be serially coupled between the pin B− and the node n22. Gate terminals of the transistors Ma1 and Mb1 may be coupled to the protection circuit 222. By the transistors Ma1 and Mb1, the protection circuit 222 may detect and mitigate over-voltage and over-current occurred at the pins B+ and B−.

In the battery pack 200, the plurality of temperature sensors (e.g., S1 to S4) may include at least one cell temperature sensor and at least one PCB temperature sensor; each cell temperature sensor may reflect a temperature of the battery cell B1, and each PCB temperature sensor may reflect a temperature of the PCB 210. The device 20 may therefore measure a cell temperature by the cell temperature sensor(s), and measure a PCB temperature by the PCB temperature sensor(s).

For example, the temperature sensor S1 may be a cell temperature sensor; the temperature sensor S1 may be coupled between the pin iT21 and the node n22, and be placed near the battery cell B1, so as to reflect temperature of the battery cell B1.

On the other hand, the temperature sensor S2 may be a PCB temperature sensor; the temperature sensor S2 may be coupled between the pins iT22 and the pin B−, and be placed near the trace P+, P− or the transistors Ma1, Mb1, so as to reflect temperature of the PCB 210. In the example of FIG. 2, the temperature sensor S3 may be another (optional) PCB temperature sensor, and the temperature sensor S4 may be another (optional) cell temperature sensor. For example, the temperature sensors S1 and S4 may be respectively placed near the anode and the cathode of the battery cell B1.

The temperature sensors S3 and/or S4 may be optional; e.g., in an embodiment, the battery pack 200 may only include temperature sensors S1, S2 and S3. In an embodiment, the battery pack 200 may include more temperature sensors in addition to the temperature sensors S1 to S4.

In the embodiment shown in FIG. 2, the device 20 may obtain a temperature reading of the temperature sensor S1 via the pin iT21. For example, the temperature sensor S1 may be a thermistor of negative temperature coefficient (NTC), and the device 20 may obtain temperature reading of the temperature sensor S1 by measuring a voltage or a current at the pin iT21. On the other hand, the device 20 may obtain a temperature reading of the temperature sensor S2 via the pin iT22. For example, the temperature sensor S2 may be another NTC thermistor, and the device 20 may obtain the temperature reading of the sensor S2 by measuring a voltage or a current at the pin iT22.

The monitoring circuit 240 may be coupled between the node n21, the node n22 and the pin iT22, and may be coupled to the temperature sensors S3 and S4. The monitoring circuit 240 may enable temperature measuring by the temperature sensors S3 and S4, so the device 20 may obtain temperature readings respectively sensed by the temperature sensors S3 and S4 via the pin iT22. Collectively via the pins iT21 and iT22, the device 20 may measure the cell temperature according to the temperature reading(s) of the cell temperature sensor(s), and measure the PCB temperature according to the temperature reading(s) of the PCB temperature sensor(s).

Figure 3A:
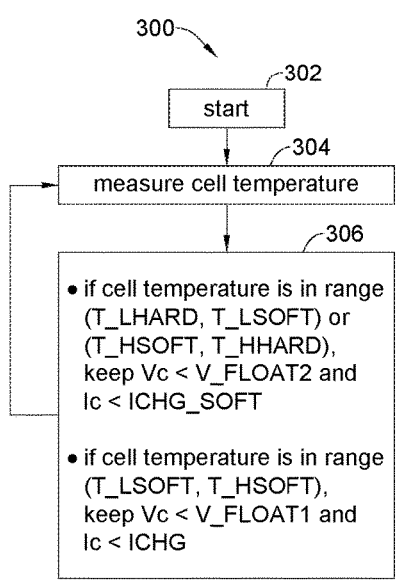
FIG. 3a illustrates a flowchart according to an embodiment of the invention.
Figure 3B:
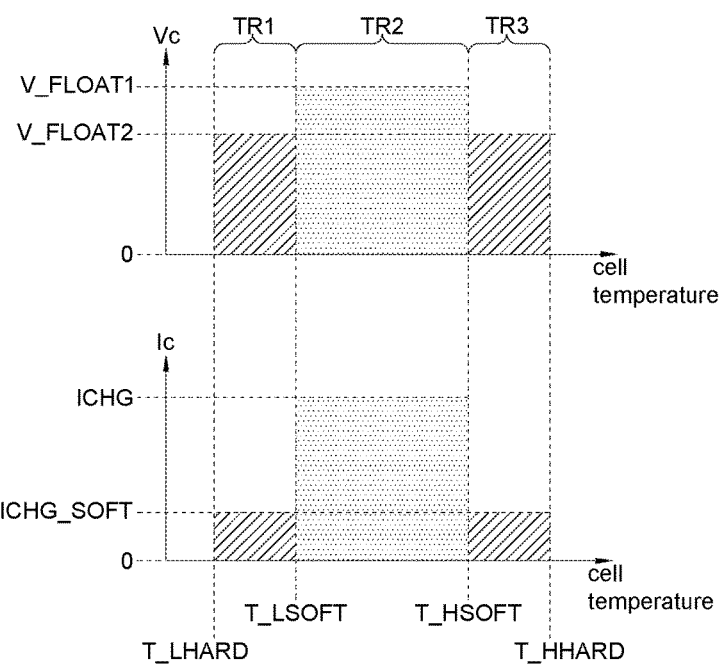
FIG. 3b illustrates operation of the flowchart in FIG. 3a according to an embodiment of the invention.
Figure 4A:
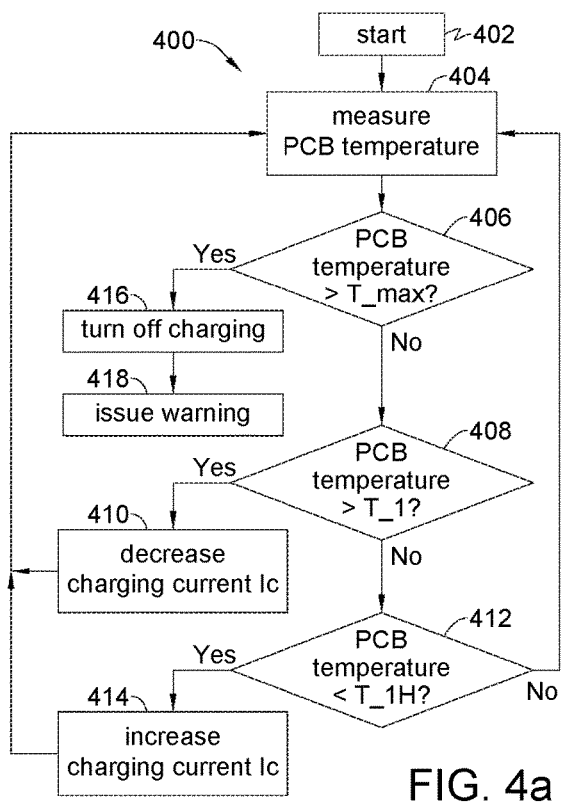
FIG. 4a illustrates a flowchart according to an embodiment of the invention.
Figure 4B:
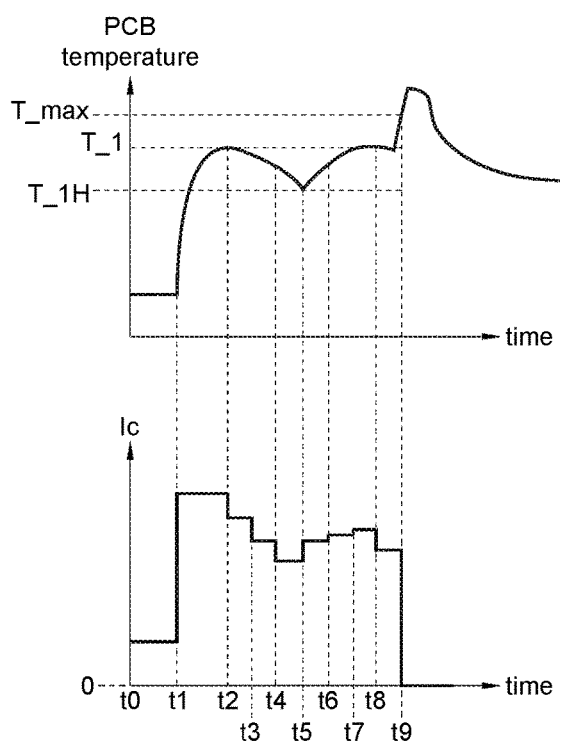
FIG. 4b illustrates an operation example of the flowchart in FIG. 4a according to an embodiment of the invention.

Along with FIG. 2, please refer to FIGS. 3a, 3b, 4a and 4b. FIG. 3a illustrates a flowchart 300 according to an embodiment of the invention, and FIG. 3b illustrates operation of the flowchart 300 according to an embodiment of the invention. FIG. 4a illustrates a flowchart 400 according to an embodiment of the invention, and FIG. 4b illustrates an operation example of the flowchart 400 according to an embodiment of the invention. When charging the battery cell B1 by the charging current Ic and the charging voltage Vc, the device 20 (FIG. 2) may execute the flowchart 300 for controlling the charging voltage Vc and the charging current Ic according to the cell temperature. In addition, when charging the battery cell B1, the device 20 may execute the flowchart 400 for adjusting the charging current Ic further according to the PCB temperature, so as to constrain temperature of the PCB 210.

As shown in FIG. 3a, main steps of the flowchart 300 may be described as follows.

Step 302: the device 20 (FIG. 2) may start the flowchart 300 when the device 20 starts to charge the battery cell B1 by a charging current Ic and a charging voltage Vc.

Step 304: the device 20 may measure a cell temperature by the cell temperature sensor(s), and proceed to step 306. For example, in an embodiment, the battery pack 200 may include a single cell temperature sensor S1, and the device 20 may obtain a cell temperature reading of the cell temperature sensor S1 by measuring current and/or voltage at the pin iT21, and utilize the cell temperature reading of the cell temperature sensor S1 as the cell temperature. In a different embodiment, the battery pack 200 may include multiple cell temperature sensors such as S1 and S4; the device 20 may obtain a cell temperature reading of the cell temperature sensor S1 by measuring current and/or voltage at the pin iT21, and obtain another cell temperature reading of the cell temperature sensor S4 via the pin iT22 and the monitoring circuit 240; then the device 20 may calculate a statistic value (e.g., a maximum, a minimum, an average or a weighted sum, etc.) of the multiple cell temperature readings of the multiple cell sensors (e.g., S1 and S4) to be the cell temperature.

Step 306: according to the cell temperature of step 304, the device 20 may control the charging voltage Vc and the charging current Ic by: keeping the charging voltage Vc below a voltage threshold V_FLOAT1 (FIG. 3b) if the cell temperature is in a middle temperature range TR2, keeping the charging voltage Vc below another voltage threshold V_FLOAT2 if the cell temperature is in a high temperature range TR3, and keeping the charging voltage Vc below the voltage threshold V_FLOAT2 if the cell temperature is in a low temperature range TR1; also, keeping the charging current Ic below a current threshold ICHG if the cell temperature is in the middle temperature range TR2, keeping the charging current Ic below another current threshold ICHG_SOFT if the cell temperature is in the high temperature range TR3, and keeping the charging current Ic below the current threshold ICHG_SOFT if the cell temperature is in the low temperature range TR1. If the cell temperature is higher than a top temperature bound T_HHARD of the high temperature range TR3 or lower than a bottom temperature bound T_LHARD of the low temperature range TR1, the device 20 may turn off charging by setting the charging voltage Vc and the charging current Ic to zero. After step 306, the device 20 may iterate back to step 304 to measure an updated cell temperature, and repeat step 306.

As shown in FIG. 3b, the voltage threshold V_FLOAT2 may be lower (less) than the voltage threshold V_FLOAT1; the current threshold ICHG_SOFT may be lower than the current threshold ICHG. The high temperature range TR3 may be higher than the middle temperature range TR2, and the low temperature range TR1 may be lower than the middle temperature range TR2. For example, the high temperature range TR3 may be between temperature bounds T_HHARD and T_HSOFT, the middle temperature range TR2 may be between temperature bounds T_HSOFT and T_LSOFT, and the low temperature range TR1 may be between temperatures bounds T_LSOFT and T_LHARD, with the temperature bounds T_HHARD>T_HSOFT>T_LSOFT>TLHARD. Values of the voltage thresholds V_FLOAT1 and V_FLOAT2, the current thresholds ICHG and ICHG_SOFT and the temperature bounds T_HHARD, T_HSOFT, T_LSOFT and T_LHARD may be set according to the JEITA guidelines, so as to be compliant to the JEITA guidelines.

Besides controlling the charging voltage Vc and the charging current Ic by the flowchart 300 shown in FIG. 3a, the device 20 may concurrently execute the flowchart 400 in FIG. 4a for adjusting the charging current Ic further according to the PCB temperature. As shown in FIG. 4a, main steps of the flowchart 400 may be described as follows.

Step 402: the device 20 (FIG. 2) may start the flowchart 400 when the device 20 starts to charge the battery cell B1 by the charging current Ic and the charging voltage Vc. In other words, the device 20 may concurrently execute the flowcharts 300 and 400 when charging the battery cell B1.

Step 404: the device 20 may measure a PCB temperature by the PCB temperature sensor(s), and proceed to step 406. For example, in an embodiment, the battery pack 200 (FIG. 2) may include a single PCB temperature sensor S2, and the device 20 may obtain a PCB temperature reading of the PCB temperature sensor S2 by measuring current and/or voltage at the pin iT22, and utilize the PCB temperature reading of the PCB temperature sensor S2 as the PCB temperature. In a different embodiment, the battery pack 200 may include multiple PCB temperature sensors such as S2 and S3; the device 20 may obtain a PCB temperature reading of the PCB temperature sensor S2 by measuring current and/or voltage at the pin iT2, obtain another PCB temperature reading of the PCB temperature sensor S3 via the pin iT22 and the monitoring circuit 240, and utilize a statistic value of the multiple PCB temperature readings of the multiple PCB sensors S2 and S3 to be the PCB temperature.

Step 406: the device 20 may compare the PCB temperature of step 404 with a maximum temperature threshold T_max. If the PCB temperature is higher than the maximum temperature threshold T_max, the device 20 may proceed to step 416, otherwise the device 20 may proceed to step 408.

Step 408: the device 20 may compare the PCB temperature of step 404 with a first temperature threshold T_1. If the PCB temperature is higher than the first temperature threshold T_1, the device 20 may proceed to step 410, otherwise the device 20 may proceed to step 412.

Step 410: the device 20 may decrease the charging current Ic.

Step 412: the device 20 may compare the PCB temperature of step 404 with a second temperature threshold T_1H. If the PCB temperature is lower than the second temperature threshold T_1, the device 20 may proceed to step 414, otherwise the device 20 may iterate back to step 404 to measure an updated PCB temperature. In an embodiment, the maximum temperature threshold T_max is not lower than the first temperature threshold T_1, and the first temperature threshold T_1 is not lower than the second temperature threshold T_1H.

Step 414: the device 20 may increase the charging current Ic.

Step 416: as the PCB temperature is higher than the maximum temperature threshold T_max in step 406, the device 20 may turn off (stop) charging.

Step 418: as the PCB temperature is higher than the maximum temperature threshold T_max, the device 20 may issue a warning message to inform user of the device 20. For example, the device 20 may issue the warning message by alarming sound, vibration, flashing status light and/or warning icon shown on screen of the device 20.

FIG. 4b shows an example of executing the flowchart 400. As shown in FIG. 4b, the device 20 may start charge the battery cell B1 at a time point t0 by an initial amount of charging current Ic. At a time point t1, the PCB temperature remains below the second current threshold T_1H, so the device 20 may increase the charging current Ic (steps 412 and 414). As the charging current Ic is increased after the time point t1, the PCB temperature starts to rise more rapidly. At a time point t2, the PCB temperature rises to be higher than the first temperature threshold T_1, so the device 20 decreases the charging current Ic (steps 408 and 410). For example, in an embodiment, the device 20 may continue to decrease the charging Ic at time points t3 and t4 after the time point t2. As the charging current Ic is decreased after the time point t2, the PCB temperature starts to fall. At a time point t5 after the time points t3 and t4, the PCB temperature falls below the second temperature threshold T_1H, so the device 20 increases the charging current Ic (steps 412 and 414). As the charging current Ic is increased after the time point t5, the PCB temperature starts to rise. At a time point t8 after time points t6 and t7, the PCB temperature rises above the first temperature threshold T_1, so the device 20 decreases the charging current Ic (steps 408 and 410). After the time point t8, it is assumed that the PCB temperature rise for some reason, and becomes higher than the maximum temperature threshold T_max at a time point t9; in response, the device 20 will turn off charging (steps 406 and 416) at the time point t9 by dropping the charging current Ic to zero, so as to lower the PCB temperature.

By executing the flowchart 400 in FIG. 4a when charging the battery cell B1, the device 20 may constrain temperature of the PCB 210 to a target range between the temperature thresholds T_1 and T_1H, and therefore improve safety of charging while maintaining a preferred (or optimized) charging speed. Although charging by a low charging current may be safe, but will suffer a longer charging time, and hence degrade charging speed. On the contrary, charging according to the flowchart 400 will not compromise charging speed, since the charging current Ic will be increased (step 414) when the PCB temperature is low (below the temperature threshold T_1H), and the charging current Ic will therefore be kept as high as possible, unless the PCB temperature rises above the temperature threshold T_1 or T_max.

According to the invention, amount of the charging current Ic may be controlled jointly by both the flowcharts 300 (FIG. 3a) and 400 (FIG. 4a). For example, while increasing the charging current Ic in step 414 of the flowchart 400, the device 20 will also keep the charging current Ic lower than the current threshold ICHG if the cell temperature is in the temperature range TR2 (FIGS. 3a and 3b), as described in step 306 of the flowchart 300. If the cell temperature rises to cross the temperature bound T_HSOFT (FIGS. 3a and 3b) from the temperature ranges TR2 to TR3, the device 20 will decrease the charging current Ic below the current threshold ICHG_SOFT in step 306 of the flowchart 300, regardless whether the PCB temperature is higher than the temperature threshold T_1 (step 408 of the flowchart 400).

Figure 5A:
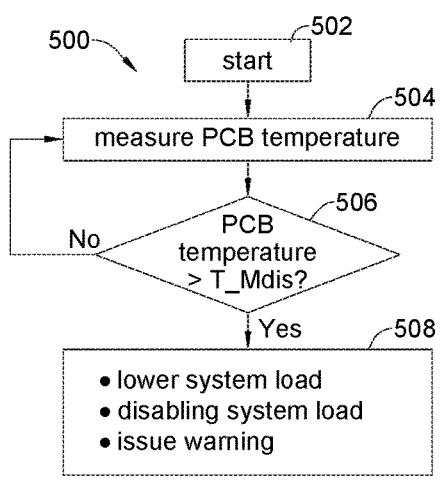
FIG. 5a illustrates a flowchart according to an embodiment of the invention.
Figure 5B:
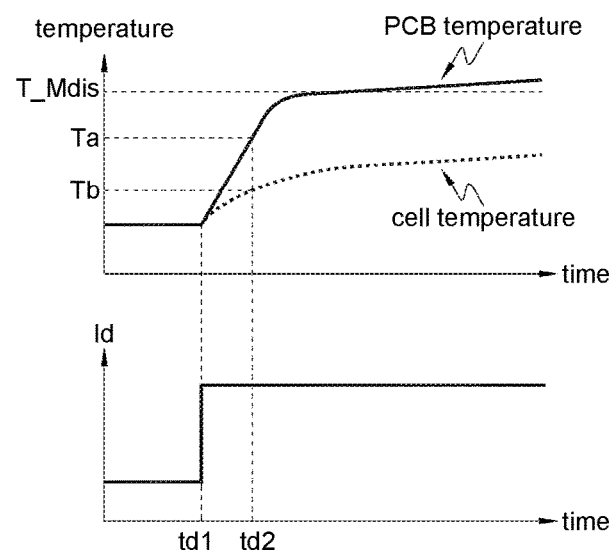
FIG. 5b illustrates an operation example of the flowchart in FIG. 5a according to an embodiment of the invention.

Along with FIG. 2, please refer to FIG. 5a and FIG. 5b. FIG. 5a illustrates a flowchart 500 according to an embodiment of the invention, and FIG. 5b illustrates operation of the flowchart 500 according to an embodiment of the invention. When the battery cell B1 (FIG. 2) discharges and supplies a discharging current Id to the device 20 which acts as a system load L_sys, the device 20 may execute the flowchart 500 for adjusting the discharging current Id according to the PCB temperature. As shown in FIG. 5a, main steps of the flowchart 500 may be described as follows.

Step 502: the device 20 (FIG. 2) may start the flowchart 500 when the device 20 starts to drain the discharging current Id supplied by the battery cell B1 of the battery pack 200.

Step 504: similar to step 404, the device 20 may measure the PCB temperature by the PCB temperature sensor(s), and proceed to step 506.

Step 506: The device 20 may compare the PCB temperature of step 504 with a discharging temperature threshold T_Mdis. If the PCB temperature is higher than the discharging temperature threshold T_Mdis, the device 20 may proceed to step 508, otherwise the device 20 may iterate back to step 504 to measure an updated PCB temperature.

Step 508: the device 20 may lower the system load L_sys, disable the system load L_sys, and/or issue a warning message similar to step 418. For example, the device 20 may suspend some components (not shown) of the device 20 to lower the system load L_sys, and/or the device 20 may shut down to disable (or minimize) the system load L_sys. When the PCB temperature is too high (e.g., higher than the discharging temperature threshold T_Mdis), lowering or disabling the system load L_sys may reduce or stop the discharging current Id, and therefore cause the PCB temperature to fall.

As shown in FIG. 5b, when discharging of the battery cell B1 starts at a time point td1, the PCB temperature will rise more rapidly than the cell temperature. For example, at a time point td2, the PCB temperature will rise to a temperature value Ta, while the cell temperature only rises to a temperature value Tb lower than the temperature value Ta. In other words, a rising slew rate of the PCB temperature is greater than a rising slew rate of the cell temperature. By equipping the battery pack 200 with additional PCB temperature sensor(s) besides cell temperature sensor(s), the invention may utilize the PCB temperature measured by the PCB temperature sensor(s) as a more sensitive indicator to earlier and faster trigger proper response (e.g., step 508) to potential and/or incoming overheating event of the battery pack 200.

In an embodiment, the device 20 may compare the PCB temperature with different discharging temperature thresholds, and accordingly perform different actions. For example, the device 20 may reduce the system load L_sys to a first level if the PCB temperature is higher than a first discharging temperature threshold but lower than a second discharging temperature threshold, reduce the system load L_sys to a second level if the PCB temperature is higher than the second discharging temperature threshold but lower than a third discharging temperature threshold, and disable (turn off) the system load L_sys if the PCB temperature is higher than the third discharging temperature threshold; wherein the first discharging temperature threshold may be lower than the second discharging temperature threshold, the second discharging temperature threshold may be lower than the third discharging temperature threshold; and, when the system load L_sys is at the second level, the system load L_sys may drain less discharging current Id than at the first level.

Figure 6:
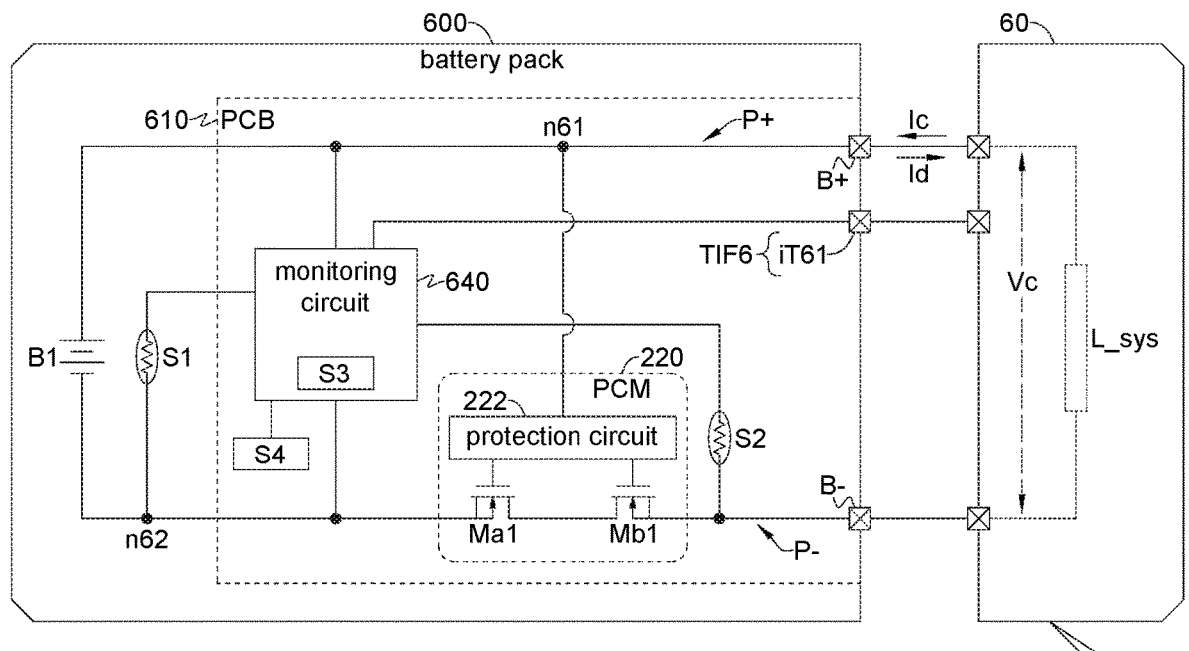
FIGS. 6 to 8 illustrate battery packs according to embodiments of the invention.

Please refer to FIG. 6 illustrates a battery pack 600 for a device 60 according to an embodiment of the invention. The battery pack 600 may include a battery cell B1, a PCM 220 mounted on a PCB 610, a monitoring circuit 640 and a plurality of temperature sensors, such as S1 to S4 in the example of FIG. 6. The PCB 610 may include two supply pins B+ and B−, along with a temperature sensor interface TIF6 which may include a single temperature interface pin iT61.

Similar to the embodiment illustrated by FIG. 2, in the embodiment illustrated by FIG. 6, the device 60 may measure a cell temperature and a PCB temperature by the plurality of temperature sensors in the battery pack 600; when charging the battery cell B1 by a charging current Ic and a charging voltage Vc, the device 60 may execute the flowchart 300 (FIG. 3a) for controlling the charging voltage Vc and the charging current Ic according to the cell temperature. In addition, when charging the battery cell B1, the device 60 may execute the flowchart 400 (FIG. 4a) for adjusting the charging current Ic further according to the PCB temperature, so as to constrain temperature of the PCB 610. When the battery cell B1 discharges and supplies a discharging current Id to the device 60 which acts as a system load L_sys, the device 60 may execute the flowchart 500 (FIG. 5a) for adjusting the discharging current Id according to the PCB temperature.

In the battery pack 600, the two pins B+ and B− may be respectively coupled to two ends (e.g., anode and cathode) of the battery cell B1 at two nodes n61 and n62 via two supply trace P+ and P− of the PCB 610. The PCM 220 may be coupled to the node n61, and may include a protection circuit 222 and two transistors Ma1 and Mb1. A drain terminal and a source terminal of the transistor Ma1 and a drain terminal and a source terminal of the transistor Mb1 may be serially coupled between the pin B− and the node n62. Gate terminals of the transistors Ma1 and Mb1 may be coupled to the protection circuit 222. By the transistors Ma1 and Mb1, the protection circuit 222 may detect and mitigate over-voltage and over-current occurred at the pins B+ and B−.

In the battery pack 600, the plurality of temperature sensors (e.g., S1 to S4) may include at least one cell temperature sensor and at least one PCB temperature sensor; each cell temperature sensor may reflect a temperature of the battery cell B1, and each PCB temperature sensor may reflect a temperature of the PCB 610. The monitoring circuit 640 may be coupled between the nodes n61 and n62, the single temperature interface pin iT61 and the plurality of sensors S1 to S4, for enabling temperature measuring by each of the plurality of temperature sensors via the pin iT61. The device 60 may therefore measure a cell temperature by the cell temperature sensor(s), and measure a PCB temperature by the PCB temperature sensor(s).

For example, the temperature sensor S1 may be a cell temperature sensor coupled between the monitoring circuit 640 and the node n62, and be placed near the battery cell B1, so as to reflect a temperature of the battery cell B1. The temperature sensor S2 may be a PCB temperature sensor coupled between the monitoring circuit 640 and the pin B−, and be placed near the trace P+, P− or the transistors Ma1, Mb1, so as to reflect a temperature of the PCB 210. In the example of FIG. 6, the temperature sensor S3 may be another (optional) PCB temperature sensor, and the temperature sensor S4 may be another (optional) cell temperature sensor.

In the embodiment shown in FIG. 6, the device 60 may access all the temperature sensors S1 to S4 of the battery pack 600 via the pin iT61 by the monitoring circuit 640, so the device 60 may measure the cell temperature and the PCB temperature of the battery pack 600. For example, the monitoring circuit 640 may collect temperature readings of the temperature sensors S1 to S4 by: (concurrently or sequentially) conducting known voltage(s) or current(s) to the temperature sensors S1 to S4, and measuring resultant currents or cross-voltages of the sensors S1 to S4. Then, in an embodiment, the monitoring 640 may sequentially transmit the (e.g., digitized) temperature readings of the temperature sensors S1 to S4 to the device 60 via the pin iT61, so the device 60 may obtain the cell temperature and/or the PCB temperature in steps 304 (FIG. 3a), 404 (FIG. 4a) and/or 504 (FIG. 5a). For example, if there are multiple cell temperature sensors to generate multiple cell temperature readings, the device 60 may calculate the cell temperature by a statistic value of the multiple cell temperature readings received from the monitoring circuit 640 via the single pin iT61. Similarly, if there are multiple PCB temperature sensors to generate multiple PCB temperature readings, the device 60 may calculate the PCB temperature by a statistic value of the multiple PCB temperature readings received from the monitoring circuit 640 via the pin iT61.

In another embodiment, the monitoring 640 may include logic processing circuitry to calculate the cell temperature by a statistic value of the multiple cell temperature readings; and/or to calculate the PCB temperature by a statistic value of the multiple PCB temperature readings. Then the monitoring 640 may output the calculated cell temperature and/or PCB temperature to the device 60 for steps 304, 404 and/or 504.

Figure 7:
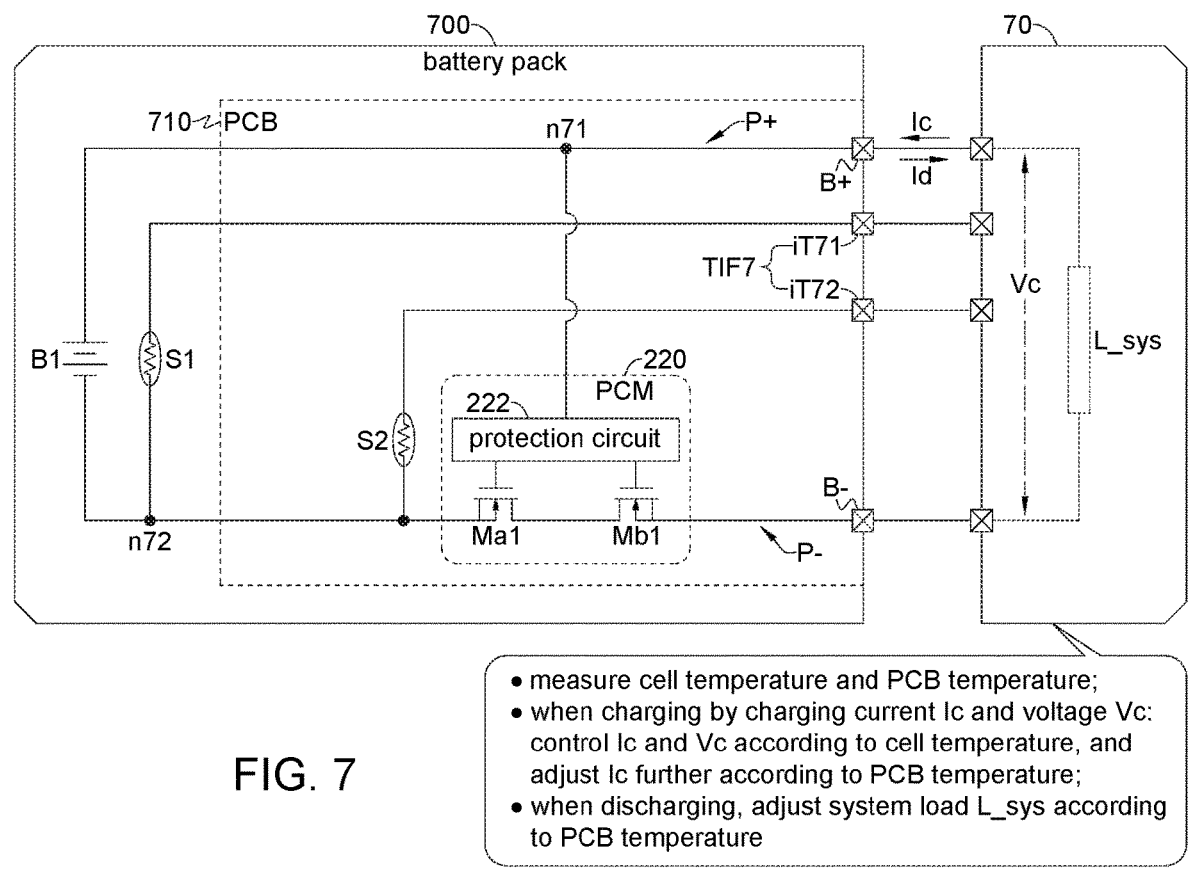

Please refer to FIG. 7 illustrates a battery pack 700 for a device 70 according to an embodiment of the invention. The battery pack 600 may include a battery cell B1, a PCM 220 mounted on a PCB 710 and temperature sensors S1 and S2. The PCB 710 may include two supply pins B+ and B−, along with a temperature sensor interface TIF7 which may include two temperature interface pins iT71 and iT72.

Similar to the embodiments illustrated by FIGS. 2 and 6, in the embodiment illustrated by FIG. 7, the device 70 may measure a cell temperature and a PCB temperature by the temperature sensors S1 and S2 in the battery pack 700; when charging the battery cell B1 by a charging current Ic and a charging voltage Vc, the device 70 may execute the flowchart 300 (FIG. 3a) for controlling the charging voltage Vc and the charging current Ic according to the cell temperature. In addition, when charging the battery cell B1, the device 70 may execute the flowchart 400 (FIG. 4a) for adjusting the charging current Ic further according to the PCB temperature, so as to constrain temperature of the PCB 710. And, when the battery cell B1 discharges and supplies a discharging current Id to the device 70 which acts as a system load L_sys, the device 70 may execute the flowchart 500 (FIG. 5a) for adjusting the discharging current Id according to the PCB temperature.

In the battery pack 700, the two pins B+ and B− may be respectively coupled to two ends (e.g., anode and cathode) of the battery cell B1 at two nodes n71 and n72 via two supply trace P+ and P− of the PCB 710. The PCM 220 may be coupled to the node n71, and may include a protection circuit 222 and two transistors Ma1 and Mb1. A drain terminal and a source terminal of the transistor Ma1 and a drain terminal and a source terminal of the transistor Mb1 may be serially coupled between the pin B− and the node n72. Gate terminals of the transistors Ma1 and Mb1 may be coupled to the protection circuit 222. By the transistors Ma1 and Mb1, the protection circuit 222 may detect and mitigate over-voltage and over-current occurred at the pins B+ and B−.

The temperature sensor S1 may be a cell temperature sensor placed near the battery cell B1 to reflect a temperature of the battery cell B1. The temperature sensor S2 may be a PCB temperature sensor arranged to reflect a temperature of the PCB 710. The device 60 may therefore measure the cell temperature by the cell temperature sensor S1 (e.g., in step 304 of FIG. 3a), and measure the PCB temperature by the PCB temperature sensor S2 (e.g., in step 404 or 504 of FIG. 4a or 5a). For example, the device 70 may measure the cell temperature by providing a known voltage or current to the cell temperature sensor S1 via the pin iT71, and measuring a resultant current or cross-voltage at the pin iT71. Similarly, the device 70 may measure the PCB temperature by providing a known voltage or current to the PCB temperature sensor S2 via the pin iT72, and measuring a resultant current or cross-voltage at the pin iT72.

Figure 8:
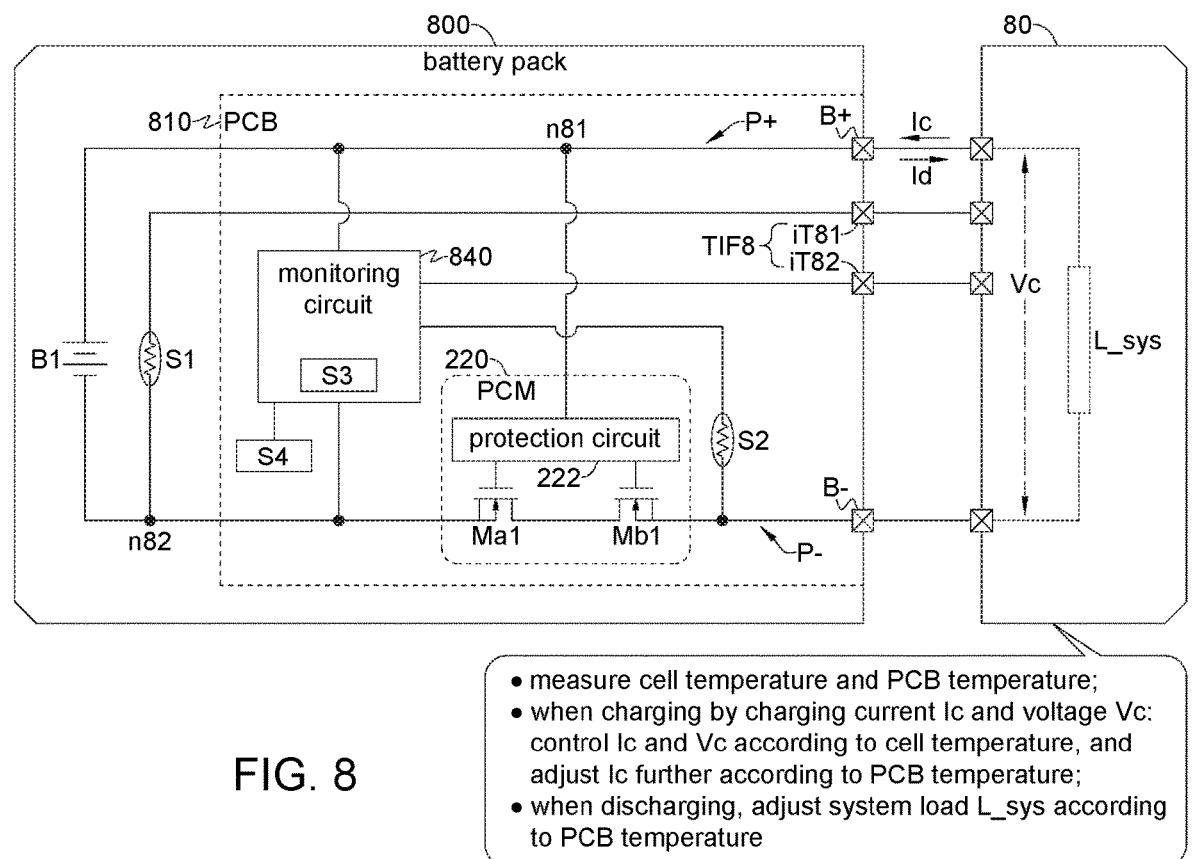

Please refer to FIG. 8 illustrates a battery pack 800 for a device 80 according to an embodiment of the invention. The battery pack 800 may include a battery cell B1, a PCM 220 mounted on a PCB 810, a monitoring circuit 840 and a plurality of temperature sensors, such as S1 to S4 in the example of FIG. 8. The PCB 810 may include two supply pins B+ and B−, along with a temperature sensor interface TIF8 which may include two temperature interface pins iT61.

Similar to the embodiments illustrated by FIGS. 2, 6 and 7, in the embodiment illustrated by FIG. 8, the device 80 may measure a cell temperature and a PCB temperature by the plurality of temperature sensors in the battery pack 800; when charging the battery cell B1 by a charging current Ic and a charging voltage Vc, the device 80 may execute the flowchart 300 (FIG. 3a) for controlling the charging voltage Vc and the charging current Ic according to the cell temperature. In addition, when charging the battery cell B1, the device 80 may execute the flowchart 400 (FIG. 4a) for adjusting the charging current Ic further according to the PCB temperature, so as to constrain temperature of the PCB 810. When the battery cell B1 discharges and supplies a discharging current Id to the device 80 which acts as a system load L_sys, the device 80 may execute the flowchart 500 (FIG. 5a) for adjusting the discharging current Id according to the PCB temperature.

In the battery pack 800, the two pins B+ and B− may be respectively coupled to two ends (e.g., anode and cathode) of the battery cell B1 at two nodes n81 and n82 via two supply trace P+ and P− of the PCB 810. The PCM 220 may be coupled to the node n81, and may include a protection circuit 222 and two transistors Ma1 and Mb1. A drain terminal and a source terminal of the transistor Ma1 and a drain terminal and a source terminal of the transistor Mb1 may be serially coupled between the pin B− and the node n82. Gate terminals of the transistors Ma1 and Mb1 may be coupled to the protection circuit 222. By the transistors Ma1 and Mb1, the protection circuit 222 may detect and mitigate over-voltage and over-current occurred at the pins B+ and B−.

In the plurality of temperature sensors (e.g., S1 to S4) of the battery pack 800, the temperature sensor S1 may be a cell temperature sensor coupled between the pin iT81 and the node b82, and arranged to reflect a temperature of the battery cell B1. On the other hand, the rest of the plurality of temperature sensors (e.g., S2 to S4) other than the cell temperature sensor S1 may include at least one PCB temperature sensor arranged to reflect a temperature of the PCB 810. For example, the temperature sensor S2 may be a PCB temperature sensor coupled between the monitoring circuit 840 and the pin B−. Optionally, the plurality of temperature sensors may, for example, further include the temperature sensor S3 as an additional PCB temperature sensor, and the temperature sensor S4 as an additional cell temperature sensor. The monitoring circuit 840 may be coupled between the pin iT82 and the rest of the plurality of temperature sensors (e.g., S2 to S4), for enabling temperature measuring by the rest of the plurality of temperature sensors. The device 80 may therefore measure a cell temperature by the cell temperature sensor(s) to implement step 304 in FIG. 3a, and measure a PCB temperature by the PCB temperature sensor(s) to implement step 404 and/or step 504 in FIG. 4a and/or 5a.

For example, the device 80 may obtain a cell temperature reading by providing a known voltage or current to the temperature sensor S1 via the pin iT81, and measuring a resultant current or voltage at the pin iT81. Concurrently or sequentially, in an embodiment wherein the temperature sensor S4 is available as another cell temperature sensor, the monitoring circuit 840 may conduct a known voltage or current to the temperature sensor S4, measure (and digitize) a resultant current or voltage to obtain an additional cell temperature reading, and then transmit the additional cell temperature reading to the device 80 via the pin iT82, so the device 80 may calculate the cell temperature utilized in step 304 (FIG. 3a) by a statistic value of the cell temperature readings of the cell temperature sensors S1 and S4.

On the other hand, the monitoring circuit 840 may also conduct a known voltage or current to the PCB temperature sensor S2, measure (and digitize) a resultant current or voltage to obtain a PCB temperature reading, and transmit the PCB temperature reading to the device 80 via the pin iT82; in an embodiment wherein the temperature sensor S3 is available as another PCB temperature sensor, the monitoring circuit 840 may conduct a known voltage or current to the temperature sensor S3, measure (and digitize) a resultant current or voltage to obtain an additional PCB temperature reading, and then transmit the additional PCB temperature reading to the device 80 also via the pin iT82, so the device 80 may calculate the PCB temperature utilized in steps 404 (FIG. 4a) and 504 (FIG. 5a) by a statistic value of the PCB temperature readings of the PCB temperature sensors S2 and S3.

To sum up, the invention may equip a battery pack of a device with at least one cell temperature sensor and at least one PCB temperature sensor to provide a cell temperature and a PCB temperature. When charging a battery cell of the battery pack by a charging current and a charging voltage, the invention may control the charging voltage and the charging current according to the cell temperature, and adjust the charging current further according to the PCB temperature, so as to constrain the temperature of the PCB. When the battery pack the battery cell discharges to a system load, the invention may adjust a system load of the device according to the PCB temperature. Accordingly, the invention may improve temperature management of the battery pack, prevent the PCB (PCM) from being another heat source, and therefore enhance safety of charging and/or discharging.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for improving temperature management of a battery pack, the battery pack comprising:
   a PCB (printed circuit board);
   a battery cell coupled to the PCB;
   a protection circuit module mounted on the PCB;
   a plurality of temperature sensors, including at least one cell temperature sensor and at least one PCB temperature sensor; each said cell temperature sensor reflecting a temperature of the battery cell, and each said PCB temperature sensor reflecting a temperature of the PCB; and
   one or more temperature interface pins;
   and the method comprising:
   via the one or more temperature interface pins, measuring a cell temperature by the at least one cell temperature sensor, and measuring a PCB temperature by the at least one PCB temperature sensor;
   when charging the battery cell by a charging current and a charging voltage, controlling the charging voltage and the charging current according to the cell temperature; and
   adjusting the charging current further according to the PCB temperature, so as to constrain the temperature of the PCB; wherein
   the PCB which the protection circuit module is mounted on is coupled between the one or more temperature interface pins and a first one of the at least one cell temperature sensor.

2. The method of claim 1, wherein the battery pack further comprises:
   a monitoring circuit coupled between the one or more temperature interface pins and the plurality of temperature sensors, for enabling temperature measuring by each of the plurality of temperature sensors.

3. The method of claim 1, wherein the one or more temperature interface pins include a first temperature interface pin and a second temperature interface pin; the first one of the at least one cell temperature sensor is coupled to the first temperature interface pin, and one of the at least one PCB temperature sensor is coupled to the second temperature interface pin.

4. The method of claim 3, wherein the battery pack further comprises:
   a monitoring circuit coupled to the second temperature interface pin, for enabling temperature measuring by rest of the plurality of temperature sensors other than the first one of the at least one cell temperature sensor.

5. The method of claim 1, wherein:
the one or more temperature interface pins include a first temperature interface pin and a second temperature interface pin;
the first one of the at least one cell temperature sensor is coupled to the first temperature interface pin; and
the battery pack further comprises:
a monitoring circuit coupled between the second temperature interface pin and rest of the plurality of temperature sensors other than the first one of the at least one cell temperature sensor, for enabling temperature measuring by said rest of the plurality of temperature sensors.

6. The method of claim 1, wherein adjusting the charging current further according to the PCB temperature comprises:
decreasing the charging current if the PCB temperature is higher than a first temperature threshold; and
increasing the charging current if the PCB temperature is lower than a second temperature threshold;
wherein the first temperature threshold is not lower than the second temperature threshold.

7. The method of claim 6, wherein adjusting the charging current further according to the PCB temperature further comprises:
turning off charging if the PCB temperature is higher than a maximum temperature threshold;
wherein the maximum temperature threshold is not lower than the first temperature threshold.

8. The method of claim 7 further comprising:
issuing a warning message if the PCB temperature is higher than the maximum temperature threshold.

9. The method of claim 1, wherein controlling the charging voltage and the charging current according to the cell temperature comprises:
keeping the charging voltage below a first voltage threshold if the cell temperature is in a middle temperature range;
keeping the charging voltage below a second voltage threshold if the cell temperature is in a high temperature range; and
keeping the charging voltage below the second voltage threshold if the cell temperature is in a low temperature range;
wherein the high temperature range is higher than the middle temperature range, the low temperature range is lower than the middle temperature range, and the second voltage threshold is lower than the first voltage threshold.

10. The method of claim 1, wherein controlling the charging voltage and the charging current according to the cell temperature comprises:
keeping the charging current below a first current threshold if the cell temperature is in a middle temperature range;
keeping the charging current below a second current threshold if the cell temperature is in a high temperature range; and
keeping the charging current below the second current threshold if the cell temperature is in a low temperature range;
wherein the high temperature range is higher than the middle temperature range, the low temperature range is lower than the middle temperature range, and the second current threshold is lower than the first current threshold.

11. The method of claim 1 further comprising:
when the battery cell discharges to a system load, adjusting the system load according to the PCB temperature.

12. The method of claim 11, wherein adjusting the system load according to the PCB temperature comprises:
lowering the system load if the PCB temperature is higher than a discharging temperature threshold.

13. The method of claim 11, wherein adjusting the system load according to the PCB temperature comprises:
disabling the system load if the PCB temperature is higher than a discharging temperature threshold.

14. The method of claim 1 further comprising:
when the battery cell discharges to a system load, issuing a warning message if the PCB temperature is higher than a discharging temperature threshold.

15. A method for improving temperature management of a battery pack, the battery pack comprising:
a PCB;
a battery cell coupled to the PCB;
a protection circuit module mounted on the PCB; and
a plurality of temperature sensors, including at least one cell temperature sensor and at least one PCB temperature sensor; each said cell temperature sensor reflecting a temperature of the battery cell, and each said PCB temperature sensor reflecting a temperature of the PCB;
and the method comprising:
when a device drains a discharging current supplied by the battery cell via the PCB, by the device, measuring a PCB temperature by the at least one PCB temperature sensor; and
by the device, adjusting a system load of the device according to the PCB temperature to adjust the discharging current drained from the battery cell.

16. The method of claim 15, wherein adjusting the system load according to the PCB temperature comprises:
lowering the system load if the PCB temperature is higher than a discharging temperature threshold.

17. The method of claim 15, wherein adjusting the system load according to the PCB temperature comprises:
disabling the system load if the PCB temperature is higher than a discharging temperature threshold.

18. The method of claim 15 further comprising:
issuing a warning message if the PCB temperature is higher than a discharging temperature threshold.

19. The method of claim 15, wherein the battery pack further comprises:
one or more temperature interface pins; and
a monitoring circuit coupled between the one or more temperature interface pins and the plurality of temperature sensors, enabling temperature measuring by each of the plurality of temperature sensors; wherein the PCB which the protection circuit module is mounted on is coupled between the one or more temperature interface pins and a first one of the at least one cell temperature sensor.

20. The method of claim 15, wherein the battery pack further comprises a first temperature interface pin and a second temperature interface pin; one of the at least one cell temperature sensor is coupled to the first temperature interface pin, and one of the at least one PCB temperature sensor is coupled to the second temperature interface pin.

* * * * *